April 3, 1951 A. B. ANDERSON 2,547,107

STABILIZED AMPLIFIER

Filed Sept. 18, 1947 3 Sheets-Sheet 1

INVENTOR
A. B. ANDERSON
BY
W. H. Dawson
ATTORNEY

April 3, 1951 A. B. ANDERSON 2,547,107

STABILIZED AMPLIFIER

Filed Sept. 18, 1947 3 Sheets-Sheet 2

INVENTOR
A. B. ANDERSON
BY W. F. Dawson
ATTORNEY

April 3, 1951 A. B. ANDERSON 2,547,107

STABILIZED AMPLIFIER

Filed Sept. 18, 1947 3 Sheets-Sheet 3

INVENTOR
A. B. ANDERSON
BY W. R. Dawson
ATTORNEY

Patented Apr. 3, 1951

2,547,107

UNITED STATES PATENT OFFICE 2,547,107

STABILIZED AMPLIFIER

Attell B. Anderson, East Orange, N. J., assignor to Bell Telephone Laboratories, Incorporated, New York, N. Y., a corporation of New York Application September 18, 1947, Serial No. 774,855

8 Claims. (Cl. 179—171)

This invention relates to direct current amplifiers, and particularly to means for compensating for variations in the cathode activity of the amplifier tubes in such amplifiers.

The object of the invention is means for compensating for variations in the cathode activity of the amplifier tubes used in a direct current amplifier without interrupting, or interfering with, the operation of the amplifier.

A feature of the invention is means for intermittently measuring the cathode activity of an amplifier tube, and manually adjustable means for compensating for variations in the cathode activity.

While the invention is of particular utility in connection with direct current amplifiers, it is not limited to this use but may be used to compensate for variations in the cathode activity of any electron discharge device. The compensation is mainly effective for variations in cathode activity, but will also compensate for other variations in the operating characteristics of the device.

In a known system for compensating for changes in cathode activity, a two-section vacuum tube, having a cathode common to both sections, is used. A common coupling resistor is connected in the common cathode-anode path of the two sections, and means are provided for adjustably biasing the control grid of the compensating section of the tube. The anode current of the working section of the tube is measured, and the bias on the grid of the compensating section adjusted until this anode current has a desired value. In order, later, to check this adjustment, the operation of the working section must be interrupted, to measure and readjust the anode current.

In accordance with one embodiment of the present invention, a two-section vacuum tube having a cathode common to both sections is used. The anode of the compensating section is energized from a potential divider and a control electrode common to both sections of this tube is adjustably connected to the potential divider. A meter is connected from a convenient point on the potential divider to the common cathode and continuously indicates the condition of the tube. The meter reading may be corrected, at any time, by adjusting the position of the connection of the control grid to the potential divider, without interference with the operation of the working section of the tube. By virtue of the negative feedback from the anode-cathode circuit of the compensating section to the control electrode common to both sections, automatic compensation for changes in emission will take place within the limits of the available feedback in the compensating section.

In another embodiment of the invention, the two-section vacuum tube may have the shape of a cathode ray tube, having a common source of electrons, two anodes, and two control grids. The common source of electrons, a control grid and an anode form the working section, amplifying the applied signal voltages. The electron beam is oscillated from anode to anode. The anode and control grid of the compensating section may be connected in the known manner, or to a potential divider as described above.

In the drawings:

Fig. 1 schematically shows a prior circuit;

Fig. 2 schematically shows one embodiment of the invention;

Fig. 3 schematically shows another embodiment of the invention;

Fig. 4 schematically shows another embodiment of the invention;

Figure 1:
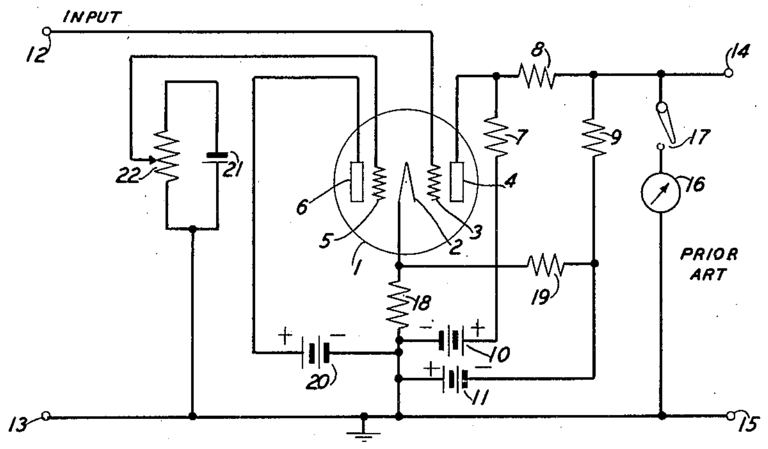

Fig. 1 discloses one stage of a compensated amplifier, of the type shown in United States Patent 2,308,997, January 19, 1943, S. E. Miller. The space discharge device 1, comprises a cathode 2, which may be heated by the usual heater (not shown). Opposite, or surrounding different longitudinal portions of the cathode 2 are the control electrodes or grids 3, 5, and beyond or surrounding these grids are the anodes 4, 6. The anode 4 may be coupled to the input circuit of a succeeding amplifier by any suitable interstage coupling network, which may be, as shown, of the type disclosed in United States Patent 1,751,527, March 25, 1930, H. Nyquist, comprising resistors 7, 8, 9, positive power supply 10 and negative biasing power supply 11. A meter 16 may be connected, as by a switch 17, or directly, to the output of the present, or a succeeding stage of the amplifier. The common cathode 2 is connected through a resistor, or other impedance, 18 to ground, and the power supplies 10, 11. If the resultant voltage of the cathode 2 with respect to ground produces an undesirably large bias of the grid 3, this may be reduced by connecting the cathode 2 through a suitable resistor 19 to the negative power supply 11.

The voltages to be amplified are applied between terminal 12 connected to the grid 3, and grounded terminal 13, and the amplified voltages appear between terminals 14, 15.

The anode 6 is connected to ground through a positive power supply 20. A grounded source of power 21 is connected to the winding of a potentiometer 22, having the brush connected to the grid 5.

The input signal voltages are disconnected from terminals 12, 13, or reduced to zero, the switch 17 is closed and the brush of potentiometer 22 adjusted until the meter 16 has the desired reading. Thus, when the adjustment of the amplifier is to be checked, the input signal voltages must be disconnected or reduced to zero, interrupting the use of the amplifier.

Figure 2:
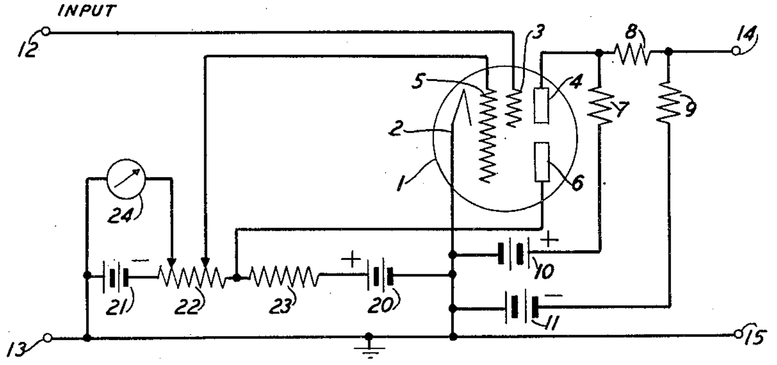

The amplifier stage shown in Fig. 2 is generally similar to the amplifier stage shown in Fig. 1, and elements having similar functions have been identified by similar reference characters.

The space discharge device 1, comprises a common cathode 2 which may be heated by the usual heater (not shown). The anodes 4, 6, are opposite, or surround, different longitudinal portions of the cathode 2. The control electrode, or grid, 3, is interposed between the cathode 2 and the anode 4; while the control electrode, or grid 5, is interposed between the cathode 2 and both the anodes 4 and 6, so as to control the currents of both the anodes 4 and 6. The cathode 2 preferably is grounded.

The grounded positive power supply 20, grounded negative power supply 21 and resistors 22, 23 are connected in series to form a potential divider. The anode 6 is connected to the junction of resistors 22, 23, while the control electrode 5 is connected to an adjustable tap in the resistor 22. A meter 24 is connected to ground from a second adjustable tap in resistor 22.

As before, the voltages to be amplified are applied between terminal 12, connected to control electrode 3, and grounded terminal 13, and the amplified voltages appear between terminals 14, 15.

Current can flow from the source 20, through resistors 23, 22, the source 21, and ground, back to the source 20, producing voltage drops across the resistors 23, 22. The potential of the control electrode 5 with respect to the grounded cathode 2 will be the negative potential of the source 21 minus the voltage drop in the portion of resistor 22 between the source 21 and the tap connected to the control electrode 5.

Initially, a meter may be connected in series with the anode 4, or across the terminals 14, 15, or at some other convenient place in the circuit, and the tap in resistor 22, connected to the control electrode 5, adjusted till the meter reading is satisfactory. The tap in resistor 22, connected to meter 24, may then be adjusted until meter 24 shows some convenient standard reading.

Current can also flow from the source 20, through resistor 23, from anode 6 through the vacuum tube 1 to cathode 2 back to the source 20, producing a second voltage drop in resistor 23. If the activity of the cathode 2 changes, this current flowing in resistor 23 will change, changing the voltage drop across resistor 23, thus changing the voltage drop across resistor 22 and the reading of meter 24. The tap in resistor 22, connected to the control electrode 5 may then be adjusted to bring the reading of meter 24 back to the standard reading, thus restoring the currents to both the anodes 4 and 6 to their original value. This adjustment is usually not very large and does not interfere with the normal operation of the amplifying section of the vacuum tube 1.

If the activity of the cathode 2 increases, the current flowing through resistor 23 to anode 6 will increase, increasing the voltage drop across resistor 23, decreasing the voltage drop across resistor 22, and increasing the negative bias on the control electrode 5, thus tending to counteract, or compensate, for the increase in the currents to the anodes 4 and 6 due to the increase in cathode activity. By this feedback from the anode-cathode circuit of the compensating section to the control electrode common to both sections, automatic compensation for changes in cathode emission is produced.

While only one working anode 4 is shown in Fig. 2, it is evident that more than one working anode, and the corresponding control electrode, may be associated with the common cathode 2, the auxiliary control electrode 5 being arranged to control the currents to all the working anodes and to the auxiliary anode 6.

Figure 3:
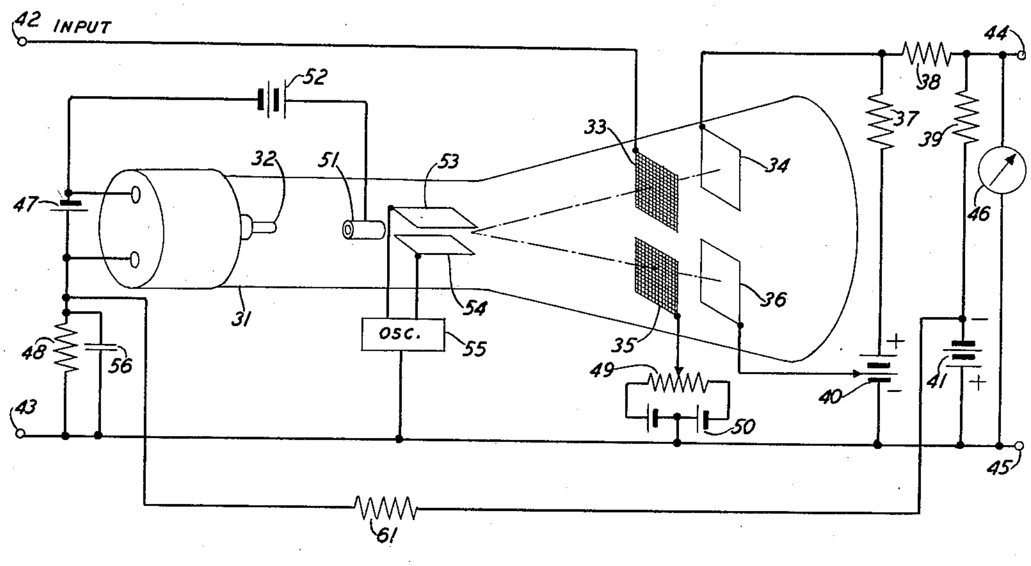

In Fig. 3, the cathode ray tube 31 has a cathode 32 heated by some suitable source 47. The electrons from the cathode 32 are accelerated through the anode 51, polarized by the power supply 52. The electron beam is oscillated by the potentials from an oscillator 55, applied to the plates 53, 54, to recurrently and alternately pass through the control electrodes, or grids, 33, 35, to the anodes 34, 36. The anode 34 is coupled to the output terminals 44, 45 by the resistors 37, 38, 39 and the power supplies 40, 41. The cathode 32 is connected to ground through resistor 48. If the resultant voltage of the cathode 32 with respect to ground produces an undesirably large bias of the grid 33, this may be reduced by connecting the cathode 32 through a suitable resistor 61 to the negative power supply 41. The signals are applied through input terminals 42, 43, between the grid 33 and ground; the amplified signals being taken off the output terminals 44, 45, for the next stage of the amplifier. A meter 46 may be connected permanently, or through a switch, to the terminals 44, 45.

A grounded source of power 50 is connected to the winding of potentiometer 49, and the brush of this potentiometer is connected to the control electrode, or grid, 35. The anode 36 is connected to a suitable tap in the source 40.

The signals are cut off, or reduced to zero, and the brush of potentiometer 49 adjusted until the meter 46 has some suitable reading. The amplifier is then ready for use.

A capacitor 56 may be connected across resistor 48 to reduce the pulsations of current in this resistor due to the oscillatory motion of the electron beam.

The oscillator 55 may produce any suitable frequency, preferably a frequency which is substantially higher than the highest frequency of the signals. If desired, the oscillator 55 may produce a square, or other non-sinusoidal, wave, causing the electron beam to pass rapidly between the anodes 34, 36, and to dwell on these anodes.

The biasing voltage on the control electrode, or grid, 35 controls the density of the electron beam drawn to the anode 36, which returns through the source 40 and resistor 48 to the cathode 32, causing the cathode 32 to have a positive potential with respect to ground. The control electrode 33 is connected through terminals 42, 43 to ground, thus this positive potential of the cathode 32 is equivalent to a negative bias on the control electrode 33. The negative bias on the control electrode 33 controls the density of the electron beam drawn to the anode 34. Thus, a change of the biasing voltage on the control electrode 35 changes the density of the electron beam, or the current, drawn to the anode 34.

In the vacuum tubes shown in Figs. 1 and 2, the two sections of the tube are activated by different portions of the same cathode. The compensation for variations in the cathode activity is based upon the assumption that the variations in cathode activity of the two portions of a cathode will be the same, but this assumption is not always accurate, as the cathode activity may change over a small local area, thus producing an erroneous compensation. In the vacuum tubes shown in Figs. 3 and 4, identically the same cathode, and electron beam, is used to activate both sections of the tube, thus, the compensation for variations in cathode activity are always accurate.

In the systems shown in Figs. 1 and 3, the signals must be cut off, or reduced to zero, during an adjustment of the amplifier, thus interrupting the use of the amplifier. In the systems shown in Figs. 2 and 4 this disadvantage is avoided.

Figure 4:
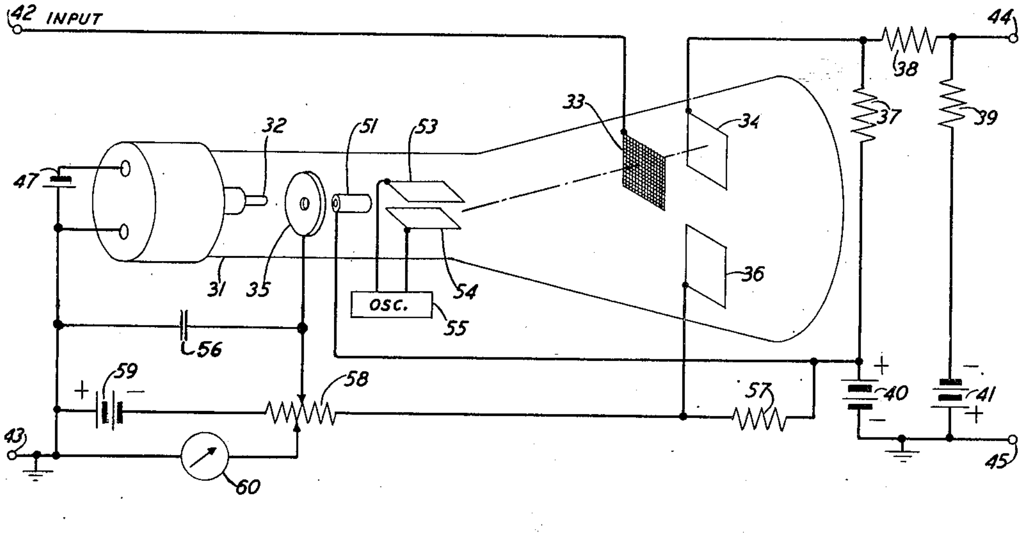

Elements having similar functions in Figs. 3 and 4 have the same reference numerals.

The cathode 32 is activated by the source 47; the electron beam is accelerated by the anode 51 polarized by the source 40, and is oscillated from anode 34 to anode 36 by the potentials impressed on the plates 53, 54 by the oscillator 55. The anode 34 is coupled to the output terminals 44, 45, by the resistors 37, 38, 39 and the sources 40, 41. The signals are applied through the input terminals 42, 43 to the control electrode, or grid 33.

The anode 36 is connected through resistor 57 to the source 40, and through the potential divider 58 to the grounded negative source of power 59. The grid 35 is moved from the vicinity of anode 36 to a position in which this grid can control the density of the electron beam impressed on both the anodes 34, 36 and is connected to one adjustable tap of potential divider 58. Capacitor 56 is connected from this adjustable tap to ground. A meter 60 is connected from a second adjustable tap of potential divider 58 to ground.

Initially, a meter is temporarily connected to the terminals 44, 45 and the brush connected to grid 35 is adjusted until this meter indicates a suitable value for the output of the working section of the tube. The brush connected to meter 60 is adjusted until meter 60 indicates a suitable value, then the meter connected to terminals 44, 45 is removed. The brush connected to meter 60 may be adjusted so that the meter 60 will have a positive, or negative, or zero reading; but it is usually more convenient to use a center zero meter normally adjusted to read zero, so that the meter 60 will indicate deviations above and below the desired value. The signals are applied to the terminals 42, 43, and the amplified signals taken off at the terminals 44, 45. If at any time the reading of meter 60 deviates from the desired value, the brush connected to the grid 35 is adjusted to bring the indication of meter 60 back to the desired value. This adjustment may be made while signals are being amplified, and does not materially affect the amplified signals.

While electrostatic plates 53, 54 have been shown for oscillating the electron beam, it is evident that other methods, such as magnetic coils, may be used for this purpose.

Figure 5:
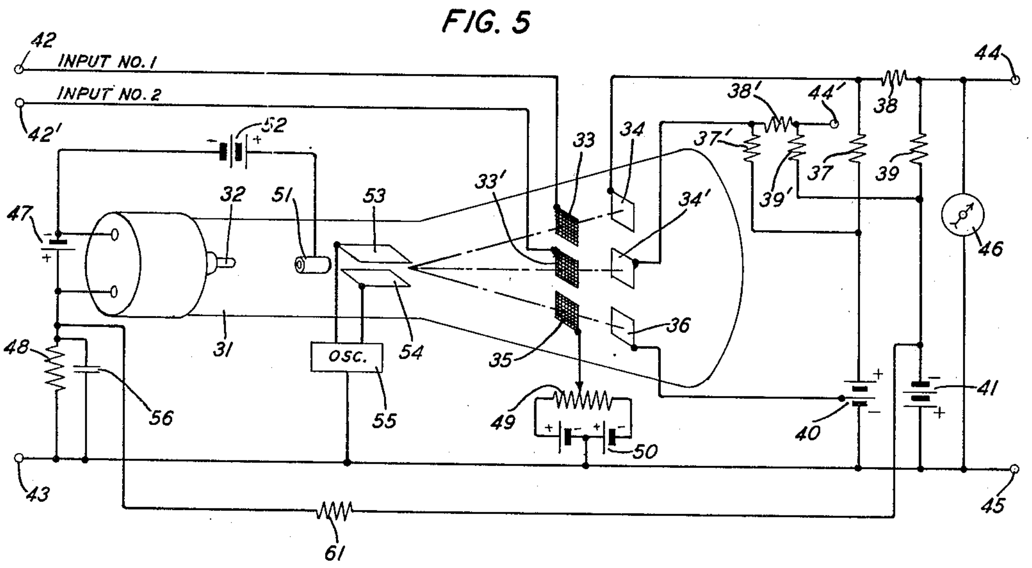
Fig. 5 is a modification of Fig. 3.
Figure 6:
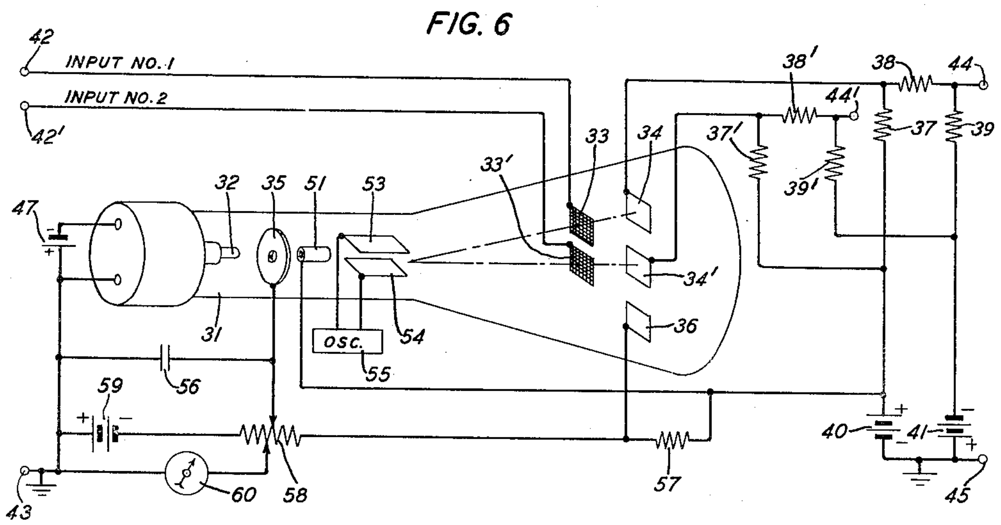
Fig. 6 is a modification of Fig. 4.

While only a single working anode 34 is shown in Figs. 3 and 4, it is evident that a plurality of such anodes, and their associated grids, may be included with the compensating anode in a single tube, as shown respectively in Figs. 5 and 6, the electron beam being arranged to sweep over all the anodes in succession. The elements in Figs. 5 and 6, for input No. 1 and the control section, having the same functions as the corresponding elements in Figs. 3 and 4 have been designated by the same reference numerals. The elements in Figs. 5 and 6 for input No. 2, having the same functions as the corresponding elements for input No. 1, have been designated by the same reference numerals primed. The operations of the devices shown in Figs. 5 and 6 will be obvious from the detailed descriptions of the operations of the devices shown in Figs. 3 and 4. Thus one compensating section may control the input sections of several different amplifiers. In this case, the integrated current drawn by the auxiliary anode is preferably not less than the sum of the currents drawn by all the working anodes.

What is claimed is:

1. An electronic translating circuit including means for producing an electronic beam, one or more working anodes, an auxiliary anode, means for recurrently sweeping said beam across all said anodes, a control electrode individual to each said working anode, input circuits individually connected to said beam producing means and said control electrodes, output circuits individually connected to said beam producing means and said working anodes, an auxiliary control electrode associated with said auxiliary anode to control the density of the electronic beam drawn to said working anodes, and means for adjustably biasing said auxiliary control electrode.

2. An electronic amplifying circuit including means for producing an electronic beam, an impedance connected to said means, one or more working anodes, an auxiliary anode, means for recurrently sweeping said beam across all said anodes, a control electrode individual to each said working anode, input circuits individually connected to said impedance and said control electrodes, output circuits individually connected to said impedance and said working anodes, a source of power connected between said impedance and said auxiliary anode, an auxiliary electrode associated with said auxiliary anode to control the density of the electronic beam drawn by said source through said impedance, and means for adjustably biasing said auxiliary electrode.

3. The combination in claim 2 in which said impedance comprises a resistor connected in parallel with a capacitor.

4. An electronic amplifying circuit including means for producing an electronic beam, one or more working anodes, an auxiliary anode, means for recurrently sweeping said beam across all said anodes, a control electrode individual to each said working anode, input circuits individually connected to said beam producing means and said control electrodes, output circuits individually connected to said beam producing means and said working anodes, an auxiliary electrode arranged to control the density of said beam, a source of power connected to said auxiliary anode, means for indicating the current flowing from said auxiliary anode and means for adjustably biasing said auxiliary electrode in accordance with said indications.

5. The combination in claim 4 in which said auxiliary anode is connected through a first resistor to a grounded positive source of power and through a second resistor to a grounded negative source of power, said auxiliary electrode is connected to a first tap in said second resistor, and a meter is connected from ground to a second tap in said second resistor.

6. An electronic amplifying circuit including one or more working anodes, an auxiliary anode, an activated cathode common to all said anodes, a control electrode individual to each working anode, input circuits individually connected to said control electrodes and said cathode, output circuits individually connected to said working anodes and said cathode, an auxiliary control electrode common to all said anodes, a first resistor and a positive source of power connecting said auxiliary anode to said cathode, a second resistor and a negative source of power connecting said auxiliary anode to said cathode, a first tap in said second resistor connected to said auxiliary control electrode, and a meter connected from a second tap in said second resistor to said cathode.

7. An electronic amplifying circuit including one or more working anodes, a control electrode individual to each working anode, an activated cathode common to all said anodes, input circuits individually connected to each control electrode and said cathode, output circuits individually connected to each working anode and said cathode, an auxiliary anode, a source of power and an impedance connected in serial relationship from said auxiliary anode to said cathode, said auxiliary anode being so located with respect to said control electrodes that the electron flow from said cathode to said auxiliary anode is independent of the potentials on said control electrodes, and an auxiliary control electrode common to all said anodes and adjustably connected to said impedance.

8. The combination in claim 7 with a meter connected to said impedance to indicate the changes in the current to said auxiliary anode.

ATTELL B. ANDERSON.

REFERENCES CITED

The following references are of record in the file of this patent:

UNITED STATES PATENTS

| Number | Name | Date |
|---|---|---|
| 2,107,410 | Dreyer | Feb. 8, 1938 |
| 2,308,997 | Miller | Jan. 19, 1943 |
| 2,354,718 | Tuttle | Aug. 1, 1944 |
| 2,392,415 | Soller | Jan. 8, 1946 |
| 2,399,441 | Krebs | Apr. 30, 1946 |